United States Patent [19]

Ruhovets

[11] Patent Number: 5,349,528
[45] Date of Patent: Sep. 20, 1994

[54] METHOD APPARATUS FOR DETERMINATION OF POROSITY LITHOLOGICAL COMPOSITION

[75] Inventor: Naum Ruhovets, Houston, Tex.

[73] Assignee: Halliburton Logging Services, Inc., Houston, Tex.

[21] Appl. No.: 22,794

[22] Filed: Feb. 23, 1993

Related U.S. Application Data

[63] Continuation of Ser. No. 492,028, Mar. 12, 1990, abandoned.

[51] Int. Cl.$^5$ .................. G01V 1/00; E21B 49/00
[52] U.S. Cl. ........................ 364/422; 73/152
[58] Field of Search ............ 364/422; 73/152; 324/366, 355

[56] References Cited

U.S. PATENT DOCUMENTS

| | | | |
|---|---|---|---|
| 4,233,839 | 11/1980 | Coates | 364/422 |
| 4,369,497 | 1/1983 | Poupon et al. | 364/422 |
| 4,584,874 | 4/1986 | Ruhovets | 73/152 |
| 4,739,255 | 4/1988 | Hagiwara | 73/152 |
| 4,752,882 | 6/1988 | Givens | 364/422 |
| 4,769,606 | 9/1988 | Vinegar et al. | 73/152 |

Primary Examiner—Roy N. Envall, Jr.
Assistant Examiner—Xuong M. Chung-Trans
Attorney, Agent, or Firm—Arnold, White & Durkee

[57] ABSTRACT

Evaluation of thinly laminated shaly sand reservoirs has long been one of the most difficult problems of log analysis. A primary reason is that only shallow shale indicators such as a Dipmeter, other microresistivity devices, or an ultra high frequency dielectric tool, etc. accomplish resolutions compatible with the most thinly bedded shale or sand laminae. To overcome this problem a technique has been developed to reconstruct deep Induction conductivity and to compute effective porosity and water saturation consistent with the high vertical resolution tools such as the Dipmeter.

To achieve greater accuracy in the evaluation of shale content and porosity, the volumes of shale are initially estimated from both a density-neutron crossplot and a high resolution shale indicator which has been integrated to the vertical resolution of the density and neutron logs. Then shale parameters for these logs are automatically adjusted within limits suggested by log data in such a way that computed shale volumes from the shale indicator and density-neutron crossplot match each other. The adjusted parameters are used to compute porosity and shale volume and the mode of distribution from the density and neutron logs and to recompute these results to the high vertical resolution level. This information is in turn used to reconstruct the deep Induction conductivity to the same vertical resolution. The technique allows water saturation determination from a Waxman-Smits type model when both dispersed and laminated clay types are present.

19 Claims, 7 Drawing Sheets

METHOD APPARATUS FOR DETERMINATION OF POROSITY LITHOLOGICAL COMPOSITION

This is a continuation of application Ser. No. 07/492,028 filed Mar. 12, 1990 now abandoned.

BACKGROUND OF THE DISCLOSURE

Most logging tools measuring porosity, resistivity, radioactivity and so on can record only average values of sand and shale properties in thinly laminated reservoirs. Only logging tools with very small radii of investigation such as the dipmeter or high frequency dielectric tool have vertical resolutions compatible with thicknesses of separate beds. These shallow investigation devices can be used to delineate thin beds within laminated reservoirs, and to determine shale volume. Such data are relatively shallow. However, evaluation of properties such as porosity, resistivity, and water saturation of these thin beds at greater distances has to be accomplished using logs with degraded vertical resolution, in combination with the high resolution shale indicator. This is possible mainly because the laminated shaly sand reservoir is a two component system (strata or laminar layers of sand and shale), and a change in properties of each of these components within the vertical resolution of most tools is rather insignificant compared to the drastic differences in properties between two components (shale versus sand) and therefore changes in the composite properties of the laminated reservoir. Since a sand component property and the logs with degraded vertical resolution usually have similar frequency characteristics, the former can be adequately restored from the logs. Subsequently, the high frequency composite log or formation property can be reconstructed from the component data and a high frequency shale indicator.

Several different methods of computing high resolution deep resistivity and other laminated reservoir parameter appear in the literature, *Laminated Sand Analysis,* D. F. Allen, SPWLA 25 Logging Symposium, Jun. 10–13, 1984; *Comparative Results of Quantitative Laminated Sand Shale Analysis in Gulf Coast Wells Using Maximum Diplog Microresistivity Information,* T. H. Quinn and A. K. Sinha, SPWLA 26th Annual Logging Symposium, Jun. 17–20, 1985; and *Taking Into Account The Conductivity Contribution of Shale Laminations When Evaluating Closely Interlaminated Sand-Shale Hydrocarbon Bearing Reservoirs,* J. Raiga-Clemenceau, SPWLA 29th Annual Logging Symposium, Jun. 5–8, 1988. The present technique has some features in common with these prior publications, but the overall teaching hereof is unique.

In laminated reservoirs, even productive ones, the volume of shale can exceed the volume of sand, and thus the volume of shale computation can strongly impact all subsequent evaluations. Accurate determination of shale volume is therefore significant. This approach matches shale volumes computed from one of several integrated high resolution shale indicators and a density-neutron crossplot by automatically adjusting shale parameters. These parameters are used to compute volumes of shale at two levels of vertical resolution; one of density and neutron logs and a second being a high resolution shale indicator. All other properties are also computed at two levels of vertical resolution, the first at low vertical resolution to compute components from composite properties and, the second at the high resolution to compute composite properties from sand and shale components. If the computations at lower resolution require different vertical resolutions, the logs with the higher vertical resolution are integrated to lower vertical resolution. Most existing water saturation equations, including the Waxman-Smits model, evaluate reservoirs having only dispersed clay. In the technique described below, the Waxman-Smits model is used to compute water saturation in the laminated shaly sand reservoirs but its parameters are adapted and used accordingly.

The disclosed technique works best in areas where properties of the sand and shale components of the laminated reservoirs have low frequency character, i.e. where variations within the sand and shale components occur much more slowly than variations in the composite character of the beds shown by high resolution logs (and caused by changes in the distribution of the laminae). This pattern is common for reservoirs in which effective porosity depends mainly on volume and mode of clay distribution. The Gulf Coast and similar areas where such laminated productive reservoirs are widely developed are primary targets for the technique described below.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2 and 3 are both density neutron cross plots wherein FIG. 2 shows correction of parameters to reconcile two shale values while FIG. 3 shows correction dependent on clay distribution;

DETAILED DESCRIPTION OF THE PREFERRED EMBODIMENT

Figure 1B:
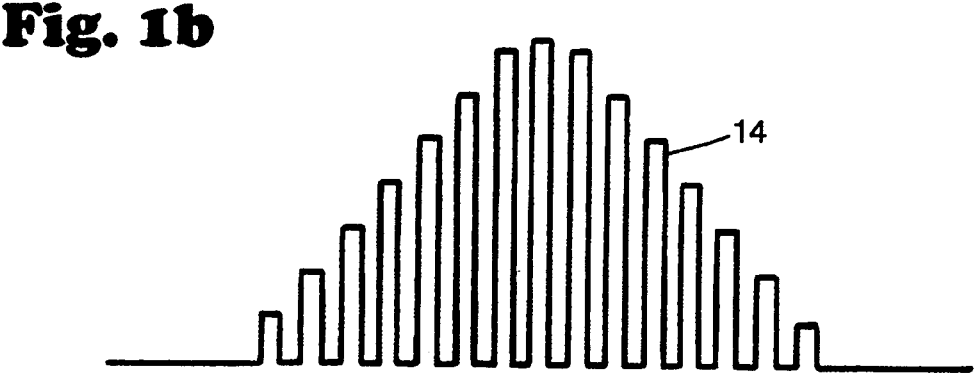
FIGS. 1($a$–$b$) show log responses and a log reconstruction approach for a laminated reservoir assuming equal thickness layers of sand and shale.

Before beginning with the description of the present disclosure, it is helpful to set out the following nomenclature. These are symbols used hereinafter:

B equivalent conductance of clay exchange cations, liter/eqv ohm m $B_c$ compound equivalent conductance of clay exchange cations, liter/eqv ohm m
$B_{sd}$ B in sand laminae, liter/eqv ohm m
$B_{sh}$ B in shale laminae, liter/eqv ohm m
CEC cation exchange capacity, meq/100 g rock
$C_o$ salinity of equilibrating NaCl solution, eqv/liter
$C_{sh}$ conductivity of shale component, mho/m
$C_{sd}$ conductivity of sand component, mho/m
$C_t$ measured formation conductivity, mho/m
$C_w$ water conductivity in sand laminae, mho/m
$C_{wc}$ compound water conductivity, mho/m
$C_{wsh}$ water conductivity in shale laminae, mho/m
$D_{cl}$ clay density, gm/cc
Den density log
$D_{sh}$ shale density, gm/cc
$D_g$ sand matrix density, gm/cc
$F^*$ formation resistivity factor in Waxman-Smits model
m cementation exponent
n saturation exponent
$N_{cl}$ neutron log response to clay
$N_{eu}$ neutron log
$N_{sh}$ neutron log response to shale
$Q_v$ concentration of clay exchange cations per unit pore volume, meq/ml
$Q_{vd}$ $Q_v$ related to dispersed clay, meq/ml
$Q_{vl}$ $Q_v$ related to laminated clay, meq/ml
$R_t$ measured formation resistivity, ohmm
$R_w$ water resistivity in sand laminae, ohmm
$R_{wsh}$ water resistivity in shale laminae, ohmm
$S_w$ effective water saturation
$S_{wt}$ total water saturation
$S_{wts}$ total water saturation in sand laminae
$V_{cl}$ volume of clay
$V_{cld}$ volume of dispersed clay
$V_{cll}$ volume of laminated clay
$V_{sh}$ volume of shale
$V_{shl}$ volume of laminated shale
$\phi_{cld}$ fraction of total porosity related to $V_{cld}$
$\phi_e$ effective porosity
$\phi$max porosity in clean sand
$\phi_{sh}$ shale porosity
$\phi_{shl}$ fraction of total porosity related to $V_{shl}$
$\phi_t$ total porosity
$\phi_{ts}$ sand component of total porosity
$\phi_{vcl}$ fraction of total porosity related to $V_{cl}$
$\phi_{vsh}$ fraction of total porosity related to $V_{sh}$ Additional subscripts are worth noting, namely a high resolution value is indicated by the subscript hr, while reconstructed value is simply indicated by the subscript r.

THE LAMINATED RESERVOIR AS A TWO COMPONENT SYSTEM

From the log analysis point of view, the thinly laminated reservoir is a reservoir where alternating sand and shale beds are quite thin, considerably thinner than the vertical resolutions of most logging tools including those which provide data for computing porosity, water saturation and other reservoir parameters. Several basic tools and their vertical resolution levels are presented in Table 1 below. All tools can be grouped into three basic groups. Each group has a certain or specific vertical resolution which are high (dipmeter, microlog, high frequency dielectric, etc.), medium (density, neutron, acoustic) and low resolution (induction, laterlog). High vertical resolution is from one to several inches and generally has very small radii of investigation. In this disclosure, the high resolution tools need only indicate shale. If the resolution is only two or three feet vertical resolution, the data is sufficient to enable volume of shale, the shale distribution, porosity, cation exchange capacity and $Q_v$ to be computed. A low vertical resolution distinguishes a few feet for the recently introduced High Resolution Induction Tool (Halliburton Logging Services, Inc.) to eight feet or more for most older induction logging tools.

TABLE 1

| VERTICAL RESOLUTION LEVELS OF LOGGING TOOLS | | |
|---|---|---|
| Resolution Level | Property Obtained | Logging Tool |
| high | shale volume | dipmeter, microlog, high frequency dielectric, unfiltered Pe-index |
| medium | shale volume, shale distribution, porosity $Q_v$ and CEC | porosity logs including density, neutron, acoustic |
| low | conductivity, resistivity | induction, laterlog |

By definition, only the high resolution tools can detect the separate (sand/shale) beds in the thinly laminated reservoir. All other tools form average or composite signals from both sand and shale laminae together, mainly as a result of the broad vertical resolutions of the tools. The resolution can vary over a range of about one hundred fold or more. To achieve accurate log interpretation, signals from the sand and shale beds have to be separated. This separation can be done because component properties of the individual sand and shale beds are nearly uniform and usually change only gradually. Thus, if ten sand layers are considered, they are usually similar in most characteristics. This is not true of the composite values from ten sand layers and ten shale layers, measured by these tools, which measured values can change drastically when crossing boundaries between sand and shale laminae. Thus the individual layer component properties are preserved better than composite properties in the average values measured by logging tools with medium or low vertical resolution.

Figure 1A:
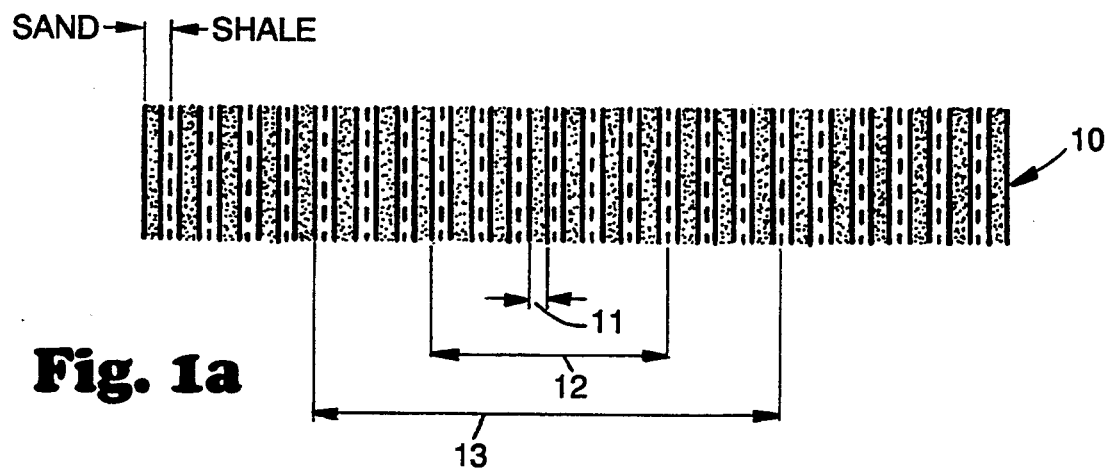

Directing attention to FIG. 1a of the drawings, a laminated shaly sand reservoir is shown to have equal thicknesses of sand and shale beds. FIG. 1b shows a measurable property X of this reservoir. The property X is any measurable property typically measured by a logging tool. The property or measurable parameter has low and constant value in shale beds and high and somewhat uneven values in the sand beds. A continuous curve at FIG. 1c through the sand values represents this property, while a straight line connecting shale values is the shale component. The curve shape is dependent on tool resolution. Assume that a tool used to measure this property has a low vertical resolution, which is several times wider than the thicknesses of the beds, and that within the vertical resolution of the tool all beds contribute to the measured signal in direct proportion to their component values regardless of their distances from the measure point. Also assume that all beds beyond tool vertical resolution do not contribute to the signal at all. Then a composite curve $X_{log}$ "measured" by this tool can be computed as follows:

$$X_{log} = X_{sd} \times (1 - V_{shl}) + X_{shl} \times V_{shl} \tag{1}$$

$X_{sd}$, $X_{shl}$, and $V_{shl}$ are the average value of the sand component of property X, the average value of laminated shale component of property X, and the average laminated shale volume respectively, within vertical resolution of the logging tool.

At the laminated formation 10, the width of tool response is crisply defined by three brackets 11, 12 and 13 which represent differing tool resolutions, the bracket 11 being a typical high resolution range of investigation. Indeed, the bracket 13 can be one hundred times wider than the bracket 11. The curve 14 shows the property X as measured by the tool sensitive to the property X as it is brought near the laminated formation 10. The curve 10 is partially dependent on the investigative tool resolution.

Figure 1E:
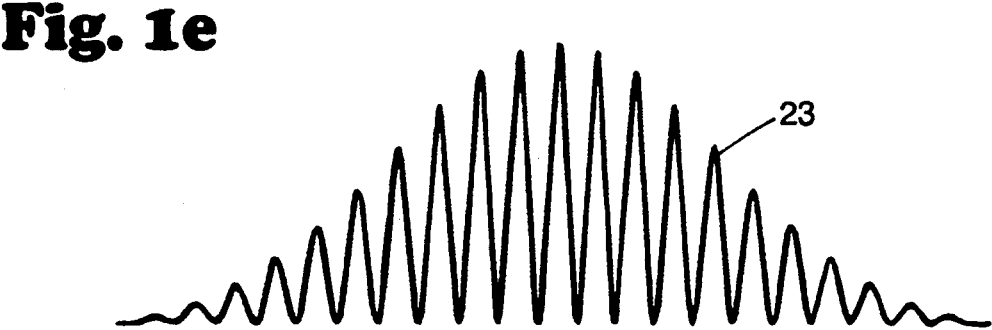
Figure 1D:
Figure 1C:
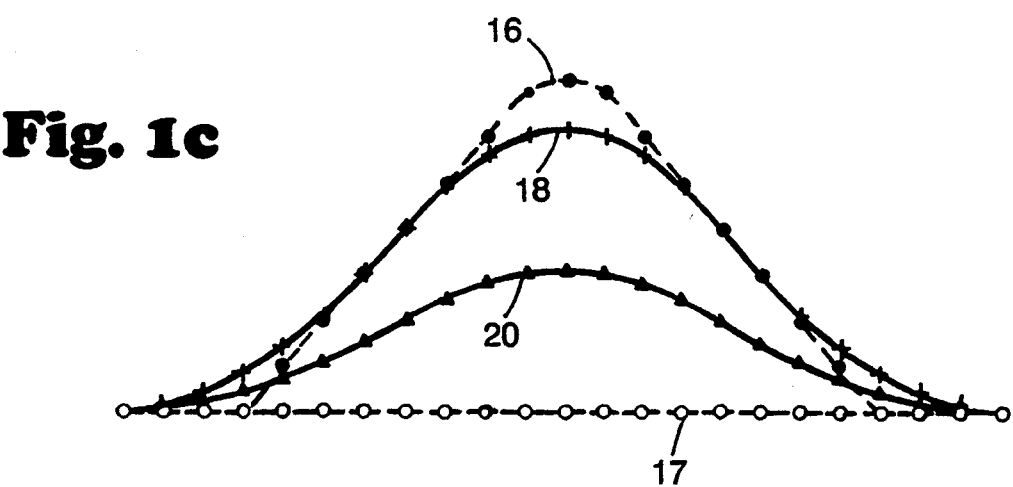

As further shown in FIG. 1c, the curve 16 is the continuous curve which is drawn through the sand values from the curve 14 therebelow. By contrast, the curve 17 is the shale curve of the property X and is a straight line because the shale value of X is low and fairly uniform.

The sand component $X_{sdr}$ of property X is the curve 18 which is reconstructed from equation 2:

$$X_{sdr} = \frac{X_{log} - X_{shl} \times V_{shl}}{1 - V_{shl}} \quad (2)$$

The "measured" $X_{log}$ curve 20 is only half the initial sand component $X_{sd}$, while the reconstructed sand component $X_{sdr}$ coincides with $X_{sd}$ on the slopes and is about 15% less at maximum of $X_{sd}$ curve. As could be expected, modeling with other examples of properties has shown generally that smoother and wider curves of the initial property value X can be more accurately reconstructed. Since laminated reservoir usually consist of many thin sand and shale laminae where the sand and shale are reasonably consistent, and, since the properties of adjacent sand laminae do not change significantly, the sand component can be reconstructed in most cases quite satisfactorily.

The volume of laminated shale $V_{shl}$ measured by a high resolution shale tool is shown at FIG. 1d where the curve 22 is used along with the sand property $X_{sdr}$ to reconstruct the composite property shown in FIG. 1e. The high vertical resolution curve 23 of $X_{rhr}$ is obtained as follows:

$$X_{rhr} = X_{sdr} \times (1 - V_{shlhr}) + X_{sh} \times V_{shlhr} \quad (3)$$

SHALE VOLUME MEASUREMENTS

Shale volume and distribution are important to this technique. They are computed at all three levels of tool vertical resolution. At the low level the laminated shale volume is used to compute sand component resistivity. At the medium resolution level, the volume of shale is used to determine formation porosity and the mode of shale distribution, namely, whether or not it is dispersed or laminated. At the high resolution level, shale volume and distribution are needed to recompute porosity, reconstruct high resolution composite resistivity and to determine water saturation.

Shale volume computed from a high resolution shale indicator can be integrated to the medium resolution level, from which the volume of laminated shale can be integrated to the low level. This procedure (converting all data for different tool resolutions) can result in loss of accuracy because the integrated log response may not be exactly equal to a linear combination (a simple summation) of the values of the individual components for several reasons. First, the vertical resolutions of logging tools are known only approximately and therefore integration of shale volume from one level to another can produce inaccurate shale volume at the lower resolution levels. Second, determination of shale parameters is often subjective and to some degree depends on the experience of the log analyst. Third, no shale indicator is perfect. Shale parameters can change due to various geological factors such as presence of hydrocarbons, or variations in shale density, porosity and hence resistivity. That is one reason it is desirable to check at least two shale indicators against each other and adjust shale parameters if necessary.

Figure 2:
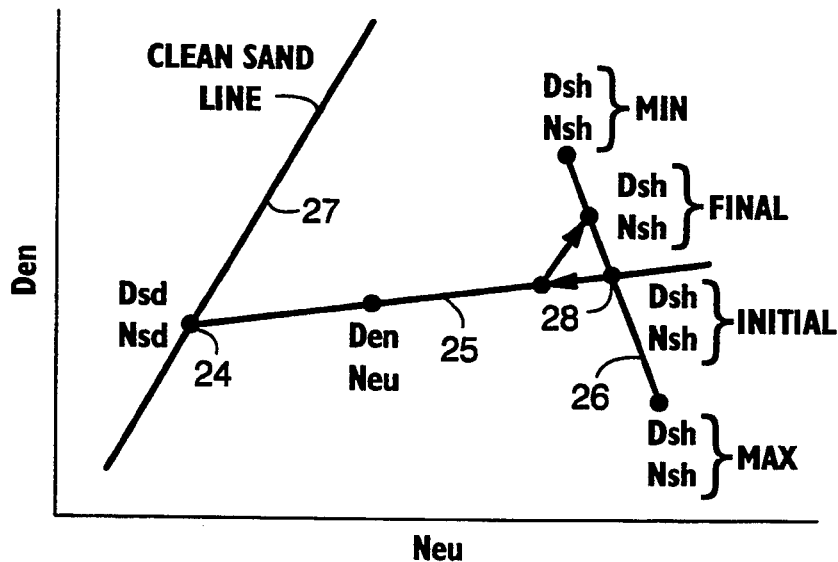

To increase the accuracy of the computed shale volume, a technique has been developed to automatically adjust shale parameters by comparing the high resolution shale volume integrated to the medium resolution level and the shale volume computed from density-neutron crossplot. The basic feature of this technique is solving two shale volume equations. This requires the density-neutron crossplot solution of FIG. 2 to be in the form used to compute shale volume from a conventional shale indicator. Thus, a neutron response to clean sand $N_{sd}$ is found at the intersection 24 of the clean sand line and a line 25 passing through the log value and wet shale point. Then the first equation can be written as:

$$V_{sh} = \frac{R_{sd} - R_{xi}}{R_{sd} - R_{sh}} = \frac{N_{eu} - N_{sd}}{N_{sh} - N_{sd}} \quad (4)$$

Where $R_{xi}$ is the integrated high resolution log used as a shale indicator, $R_{sh}$ is the high resolution log response in shale; and $R_{sd}$ is the high resolution log response in sand. Another equation is an equation of proportionality. Parameters can be changed within certain limits defined by their maximum and minimum values. The shale parameter, having greater possible deviation, will change more and one can therefore define equation 5:

$$\frac{N_{sh}\max - N_{sh}}{N_{sh}\max - N_{sh}\min} = \frac{R_{sh}\max - R_{sh}}{R_{sh}\max - R_{sh}\min} \quad (5)$$

Solving the two equations 4 and 5 together, the two unknowns $R_{sh}$ and $N_{sh}$ can be found. At this stage, the parameter $N_{sh}$ is located by a point on the line 26 connecting log and shale points. This point is projected parallel to the clean sand line 17 onto the line 26 connecting the labelled maximum and minimum values of density and neutron shale parameters and the intersection 28 finally defines both parameters $N_{sh}$ and $D_{sh}$ in FIG. 2. Adjusted shale parameters from the point 28 and corrected parameter $R_{sh}$ are then used to compute volumes of shale on both high and medium resolution levels.

Since the presence of light hydrocarbons (e.g., CH$_4$) can influence density and neutron log responses, for an accurate shale volume determination, logs have to be corrected if the density of light hydrocarbons in the formation is known. A high resolution shale indicator such as a dipmeter has a very small radius of investigation of one to two inches; in highly porous and permeable formations, the dipmeter measures only the flushed zone. Thus the influence of hydrocarbons on such a log is often negligible. If density and neutron logs cannot be corrected for light hydrocarbons, the volume of shale in hydrocarbon bearing zones should be determined only from a high resolution shale indicator (e.g., dipmeter)

using a shale parameter which can be adjusted in a water bearing interval.

Sand parameters cannot be corrected simultaneously during the adjusting of shale parameters. However, if the required adjustment of shale parameters exceeds minimum or maximum limits (see FIG. 2), then the next step is to adjust the sand parameters. This usually occurs in zones of low shale content where incorrectly defined sand parameters could result in very large corrections in the shale parameters. In water and oil bearing reservoirs, only the sand parameter of the high resolution shale indicator should be adjusted because density-neutron crossplot definitively locates the clean sand line except in cases where the density of sand matrix or/and water changes. Then, the sand parameter of the high resolution shale indicator is used to determine the volume of shale in zones having light hydrocarbons. The technique of adjusting sand parameters is similar to the one described for adjusting shale parameters.

FORMATION POROSITY AND MODE OF CLAY DISTRIBUTION

Medium Vertical Resolution Level

After shale volume is determined (best done by the foregoing approach), the effective and total porosities at the medium level can be computed conventionally from the density-neutron crossplot. Then shale porosity (bound water content) is defined by equation 6:

$$\phi_{sh} = \frac{\phi_t - \phi_e}{V_{sh}} \quad (6)$$

One method of determining the clay distribution with all three types of clay (dispersed, laminated and structural) present was developed earlier by Ruhovets, N. and Fertl W. H., *Digital Shaly Sand Analysis Based on Waxman-Smits Model and Log-Derived Clay Typing*, 7th European Logging Symposium, Oct. 21-12, 1981, Paris France. Since structural clay occurs rarely, only the dispersed and laminated clays are significant to this disclosure. For most geological conditions, derivation of an equation for the clay distribution is given by equations 7 through 10:

$$\phi_e = \phi_{max}(1 - V_{shl}) - V_{shd} \quad (7)$$

If only laminated and dispersed clays are present, one obtains:

$$V_{cld} = V_{sh} - V_{shl} \quad (8)$$

$$\phi_e = \phi_{max}(1 - V_{shl}) - V_{sh} + V_{shl} \quad (9)$$

$$V_{shl} = \frac{V_{sh} - \phi_{max} + \phi_e}{1 - \phi_{max}} \quad (10)$$

$V_{cld}$ is determined from equation 8.

Laminated shale is a detrital (allogenic) deposit, and thus always contains not only clay minerals but also other fine grained materials such as silt, carbonates, organic matter and so on. According to Yaalon, D. H., Clay Minerals Bull., 5(27), 31-6, 1962, based on analysis of 10,000 shales, clay minerals constitute just under 60% of average shale. Thus laminated clay is only a part (e.g., almost 60%) of laminated shale. On the contrary, dispersed clay is primarily authigenic clay minerals formed after the sand was deposited, Visser, R., Bours, K. A. T., van Baaren, J. P., *Effective Porosity Estimation in the Presence of Dispersed Clay*, SPWLA 29th Logging Symposium, Jun. 5-8, 1988. The percentage of clay in shale (or clay/shale ratio) is an important regional parameter (CLSH) in the present technique. If this parameter has not been determined for the selected area of investigation, a default value of 60% is usually assumed.

Figure 3:
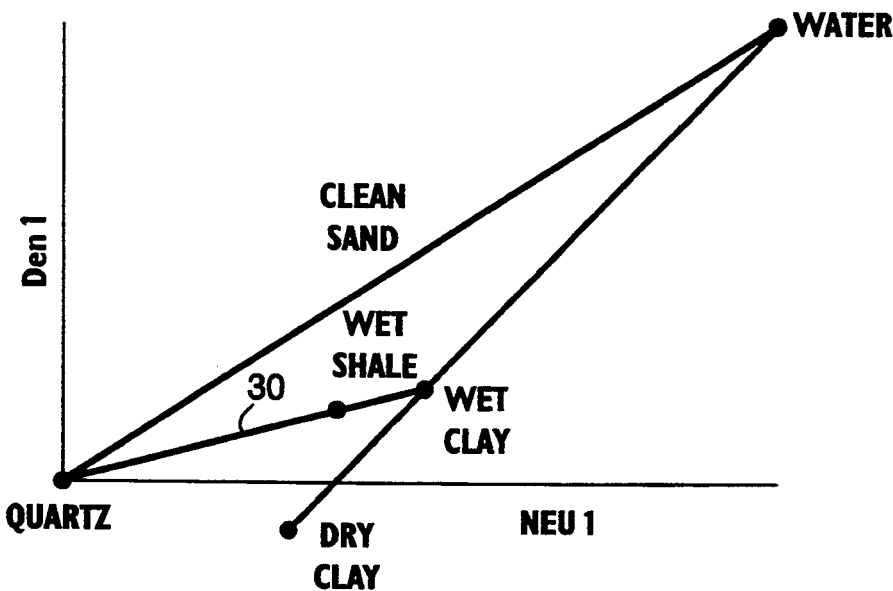

Shale parameters such as $D_{sh}$ and $N_{sh}$ are usually determined in intervals of 100% shale. These parameters depend on clay content in shale and properties of clay and non-clay (mainly silt) materials. If the average density and hydrogen index of dry clay are known, then the parameters of wet clay, such as $D_{cl}$ and $N_{cl}$, are found by extending the straight line 30 connecting the sand matrix point and the wet shale point on the density-neutron crossplot in FIG. 3. Then the clay/shale ratio (CLSH) can be determined in the following manner:

$$CLSH = \frac{N_{sh}}{N_{cl}} \quad (11)$$

or:

$$CLSH = \frac{D_g - D_{sh}}{D_g - D_{cl}} \quad (12)$$

Correspondingly, if the clay/shale ratio is known, the parameters $N_{cl}$ and $D_{cl}$ can be determined from equations 11 and 12.

Since parameters $D_{sh}$ and $N_{sh}$ are determined in 100% shale where dispersed clay is not present, use of these parameters to compute volume and mode of clay distribution in shaly sand reservoirs can be erroneous. Actually, if only laminated shale is present in a shaly reservoir, $D_{sh}$ and $N_{sh}$ are used to determine the volume of shale. If only dispersed clay is present, $D_{cl}$ and $N_{cl}$ are used to determine the volume of clay. If both dispersed clay and laminated shale are present in the shaly reservoir, density and neutron parameters should be somewhere between these two sets of shale and clay parameters. Thus, after the volume of shale and the mode of clay distribution are determined, the parameters $D_{sh}$ and $N_{sh}$ are corrected through an iteration process.

The iteration process includes the following six steps after shale volume, effective porosity, and mode of clay distribution are computed using original parameters $D_{sh}$ and $N_{sh}$:

Step 1. Volume of clay ($V_{cl}$) is found:

$$V_{cl} = V_{cld} + CLSH \times V_{shl} \quad (13)$$

Step 2. Clay/shale ratio of the reservoir (CSR) is determined:

$$CSR = \frac{V_{cl}}{V_{sh}} \quad (14)$$

Step 3. Parameter $N_{sh}$ is corrected:

$$N_{shc} = CSR \times N_{cl} \quad (15)$$

Step 4. Correct the parameter $D_{sh}$ similarly:

$$D_{shc} = D_g - CSR \times (D_g - D_{cl}) \quad (16)$$

Step 5. The new volume of shale is determined from the density-neutron crossplot using corrected parameters $N_{shc}$ and $D_{shc}$ (See FIG. 3).

Step 6. New $V_{shl}$ and $V_{cld}$ are computed, ending one iterative loop.

The iteration continues (steps one to six) until $V_{sh}$ or one of the other variables such as CSR or $N_{sh}$ converges. Usually about five iterations are required.

High Vertical Resolution Level

Computation of total and effective porosities and the clay distribution mode at the high resolution level is performed through computation of the sand component of total porosity. The easiest way is to compute the high resolution effective porosity from the total porosity as follows:

$$\phi_{ehr} = \phi_t - \phi_{sh} \times V_{shhr} \tag{17}$$

However, in this case one must assume that not only the total porosity does not change significantly within the vertical resolution of the porosity log, but also one must assume that the total porosities of the sand and shale laminae are approximately equal; the latter is often a poor assumption. It is much wiser to assume that the sand component of total porosity does not change significantly within the vertical resolution of the porosity tool. This component can be found from equation 18:

$$\phi_{ts} = \frac{\phi_t - \phi_{sh} \times V_{shl}}{1 - V_{shl}} \tag{18}$$

If the volume of laminated shale from high resolution log is known, the total and effective porosities are found from equations 19 and 20:

$$\phi_{thr} = \phi_{ts} \times (1 - V_{shlhr}) + (\phi_{sh} \times V_{shlhr}) \tag{19}$$

$$\phi_{ehr} = \phi_{thr} - (\phi_{sh} \times V_{shhr})$$

But the volume of laminated shale is not yet known for the high resolution log. Therefore, substituting equation 19 into 20, one has equation 21:

$$\phi_{ehr} = \phi_{ts} - V_{shlhr} \times (\phi_{ts} - \phi_{sh}) - (\phi_{sh} \times V_{shhr})$$

One can also write equation 22, which is similar to equation 10:

$$V_{shlhr} = \frac{V_{shhr} - \phi_{max} + \phi_{ehr}}{1 - \phi_{max}} \tag{22}$$

Substitution of $\phi_{ehr}$ from equation 21 into equation 22 gives an equation 23 for computing volume of laminated shale at the high resolution level:

$$V_{shlhr} = \frac{V_{shhr} \times (1 - \phi_{sh}) - \phi_{max} + \phi_{ts}}{1 - \phi_{max} - \phi_{sh} + \phi_{ts}} \tag{23}$$

Now, total and effective porosities at the high resolution level are found from equations 19 and 20. Volume of dispersed clay is determined from equation 24:

$$V_{cldhr} = V_{shhr} - V_{shlhr} \tag{24}$$

The volume of laminated clay is determined as from equation 25:

$$V_{cllhr} = CLSH \times V_{shlhr} \tag{25}$$

RESISTIVITY

In thinly bedded laminated reservoirs, the thickness of the sand and shale laminae is usually considerably less than the vertical resolution of a conductivity (resistivity) measuring tool. Thus the measured conductivity in such conditions is a composite value of sand and shale conductivities as defined by equation 1. Geometric analysis of the measured conductivity can be presented according to the geometric factor theory as equation 26:

$$C_t = \sum_1^n G_i \times C_i \tag{26}$$

where $G_i$ and $C_i$ are respectively the vertical geometric factors and conductivities of thin cross sections above and below of the tool measure point.

Combining equations 1 and 26, one obtains equation 27:

$$C_t = \sum_1^n G_i \times C_{sdi} \times (1 - V_{shli}) + \sum_1^n G_i + C_{shi} \times V_{shli} \tag{27}$$

Assuming either that conductivity of either the sand or the shale does not change significantly, or that they change linearly within the vertical resolution of the induction tool, equation 27 simplifies to equation 28:

$$C_t = C_{sd} \sum_1^n G_i \times (1 - V_{shli}) + C_{sh} \sum_1^n G_i \times V_{shli} \tag{28}$$

Then the conductivity of the sand component can be found by rearranging terms to yield equation 29:

$$C_{sd} = \frac{C_t - C_{sh} \sum_1^n G_i \times V_{shli}}{1 - \sum_1^n G_i \times V_{shli}} \tag{29}$$

Finally, the reconstructed composite conductivity at the high resolution level is given by equation 30:

$$C_{trhr} = C_{sd} \times (1 - V_{shlhr}) + C_{sh} \times V_{shlhr} \tag{30}$$

Recalling that conductivity and resistivity are inversely related, reconstructed high resolution composite resistivity $R_{trhr}$ is derived from $C_{trhr}$ and is used to determine water saturation at the high resolution level.

WATER SATURATION

Determination of water saturation in laminated shaly sand reservoirs requires an equation permitting both laminated and dispersed clays to be present.

Contrary to this need, the overwhelming majority of water saturation equations are developed for reservoir with dispersed clay only as exemplified by Worthington, P. F., *The Evaluation of Shaly-Sand Concepts in Reservoir Evaluation. The Log Analyst*, January–February, 1985. The well known Poupon equation, Poupon, A., Loy, M. E. and Tixier, M. P., *A contribution to Electrical Log Interpretation in Shaly Sand*, Trans. AIME 201, 138–145 for laminated reservoir assumes clean sand beds in laminated reservoirs. It would be desirable to use the Waxman-Smits model Waxman, M. H., Smits, L. J. M., *Electrical Conductivities in Oil-Bearing Shaly Sands*, SPE Journal, June 1968 for water saturation determination because it has a strong theoretical and experimental basis and is widely accepted by the industry. But the Waxman-Smits equation 31, supra., was developed for reservoirs with dispersed clay only:

$$S_{wtn} = \frac{F^* \times R_w}{R_t \times (1 + R_w \times B \times Q_v/S_{wt})} \tag{31}$$

The following analysis of the Waxman-Smits model shows that it can be adjusted for reservoirs which contain both laminated and dispersed clays if the parameters are adapted and used accordingly.

FORMATION RESISTIVITY FACTOR

The Waxman-Smits model is based on two basic assumptions. The first is a parallel conductance mechanism for free electrolyte and clay exchange cation components, Waxman, supra. Since the electrolyte contained in the pores of shale laminae is customarily called "bound water", in laminated reservoirs the parallel conductance mechanism can be assumed for clay exchange cations and electrolyte (free or bound) contained in all pores whether sand or shale. Therefore, the first assumption is applicable to a laminated reservoir in no less degree than to a reservoir with dispersed clay.

The second assumption is that "the electric current transported by counterions associated with the clay travels along the same tortuous path as the current attributed to the ions in the pore water", Waxman, supra. The same geometric factors are attributed to both conductive elements.

In laminated reservoirs there are interbedded sands and shales which usually provide different tortuous paths for the electric current. But according to the second assumption, in each of these beds the current transported by the counterions should follow the same tortuous path as the current transported by the ions in the pore water of the sand or shale beds. The resulting heterogeneous conductive media of laminated reservoirs should also have the same tortuous paths for currents transported both by ions of pore water in sand and shale laminae, and also by counterions associated with clay in these beds. Thus the second assumption is confirmed for the Waxman-Smits model so that it also applies to laminated reservoirs.

Figure 4:
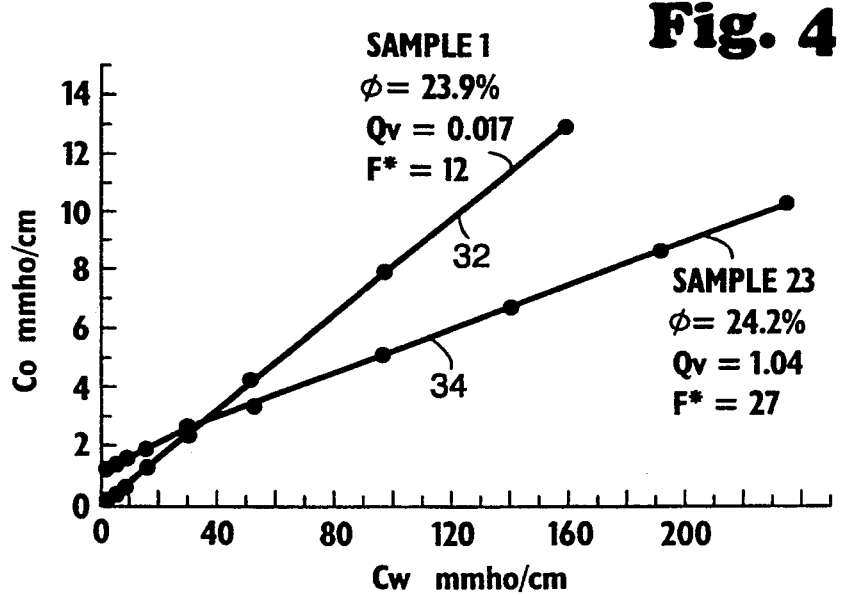
FIG. 4 is a plot of different formation resistivity factors for different samples with approximately equal porosities.
Figure 5:
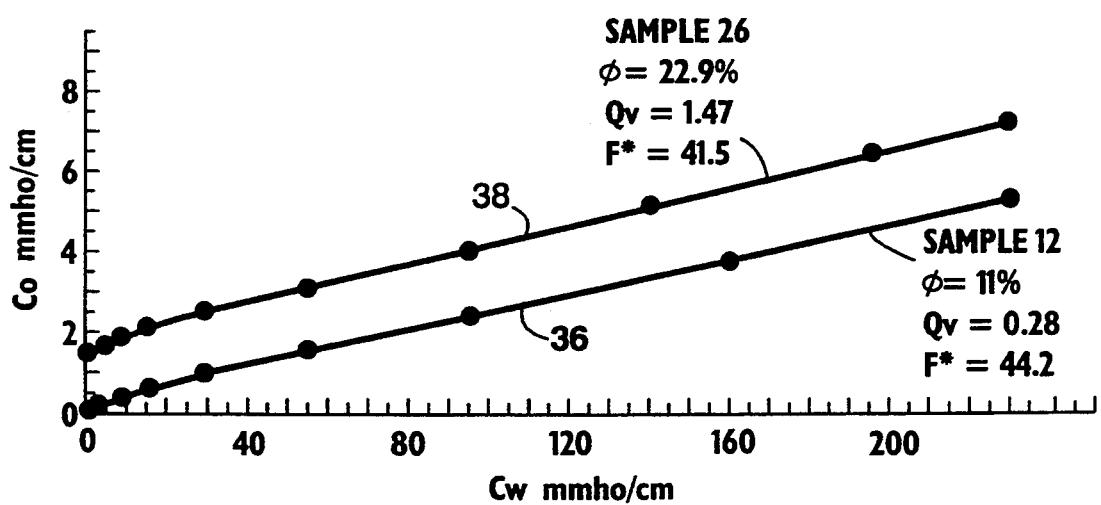
FIG. 5 is a similar plot to FIG. 4 showing relatively clean samples with different porosities.

Waxman-Smits experimental data, Waxman, supra. indicates that the formation resistivity factor is usually greater in reservoirs with the greater clay content assuming their porosities are approximately equal, see the curves 32 and 34 in FIG. 4. Both samples 1 and 23 are from Waxman supra., Table 7 and have porosities of about 24%, but the sample 23 has a high Clay content ($Q_v = 1.04$), and $F^* = 27$ while the sample 1 has $F^* = 12$. Shaly and clean sands can have the same formation resistivity factor exemplified by the curves of FIG. 5, derived also from Waxman, supra., Table 7, as this drawing shows, but the relatively clean sample represented by the curve 36 has considerably lower porosity of 11% than the shaly sample represented by the curve 38, or about 23%.

As stated in Winsauer, W. O., Shearin Jr., H. M., Masson, P. H., and Williams, M., *Resistivity of Brine-Saturated Sands in Relation to Pore Geometry*, Bull. AAPG, Vol. 36 (2), February 1952, the formation resistivity factor depends on porosity and tortuosity. The Archie equation and other formulae which relate formation resistivity to porosity alone are mainly approximations which only work well in clean reservoirs where tortuosity mainly depends on porosity. Thus the larger formation resistivity factors in shalier reservoirs (relative to cleaner reservoirs of the same porosity) can be explained by greater tortuosity in shalier reservoirs and shales. It has been observed by Parkhomenko, E. I., *Electrical Properties of Rocks* Plenum Press, New York, 1967, that the tortuosity of sedimentary rocks increases with decreasing grain size. This is not very noticeable in sands because the difference in grain sizes of coarse versus fine grained sands is not great when compared to grain sizes of clays (generally less than 2 $\mu$m), or about two orders of magnitude smaller than fine sand grains.

Figure 6:
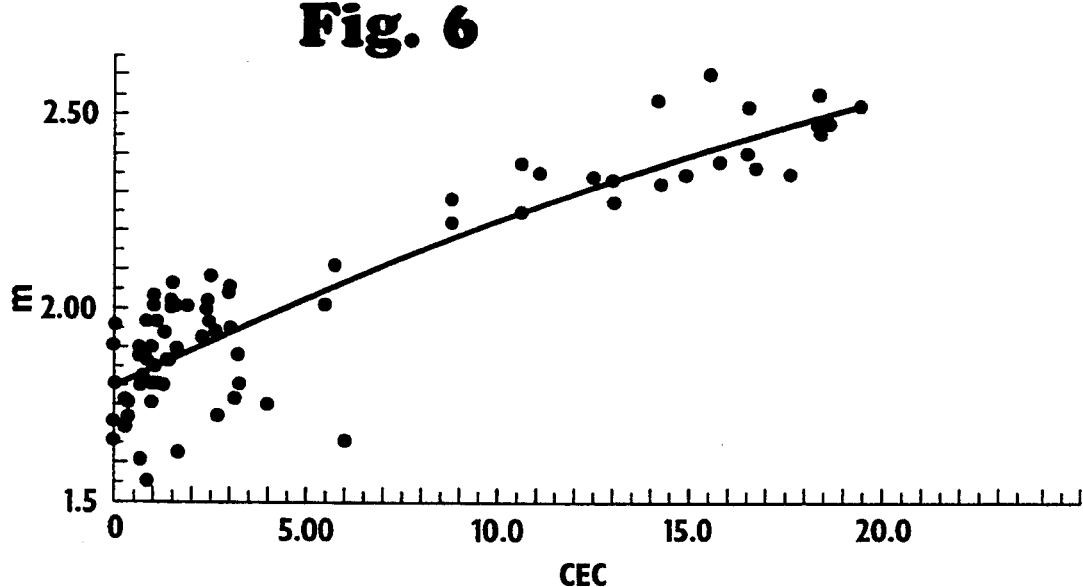
FIG. 6 shows a plot of the cementation exponent m versus C E C.
Figure 7:
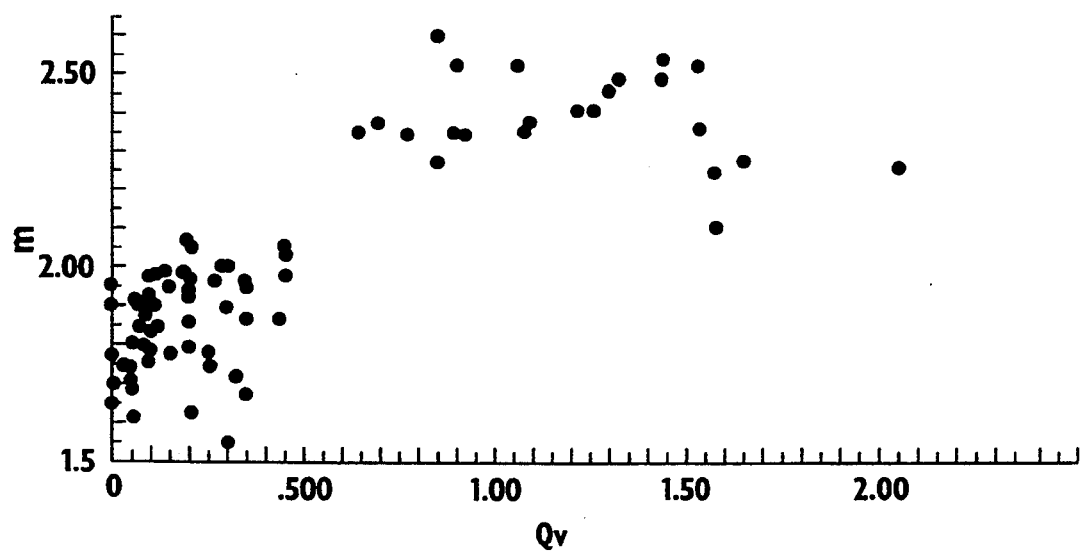
FIG. 7 is a plot of cementation exponent m versus $Q_v$.

The formation resistivity factor dependence on the volume of shale is also seen from the relationship between the cementation exponent m and CEC or $Q_v$ derived from experimental data tabulated in Waxman, supra. The exponent m increases in a non-linear fashion from about 1.78 in clean sand to about 2.5 in very shaly sand with CEC of 20 meq/100 g and $Q_v = 1.6$ meq/ml. These are shown in FIGS. 6 and 7 respectively. The dispersion of points on the plot m=f(CEC) is considerably less than for the plot of m=f($Q_v$). This suggests the greater desirability of using the relationship between m and CEC for the m computation. Regression analysis of this relationship gives equation 32:

$$m = 1.78 + 0.0518 \times CEC - 0.00072 \times CEC^2 \tag{32}$$

Another relationship between m and $Q_v$ is presented in Brown, G. A., *The Formation Porosity Exponent-The Key to Improved Estimates of Water Saturation in Shaly Sands*, SPWLA 29th Annual Logging Symposium, Jun. 5-8, 1988. Thus the formation resistivity factor in the Waxman-Smits equation is given by equation 33:

$$F^* = \phi_t^{-m} \tag{33}$$

The value of m is preferably determined by equation 32.

CATION EXCHANGE CAPACITY AND $Q_V$

In the Waxman-Smits model, $Q_v$ is defined as CEC per unit of total pore volume. Neither of these parameters can be measured in situ by logging tools. They are usually found by core analysis or indirectly from other log derived parameters such as volume of shale, SP, GR and others Donovan, W. S. and Hilchie, D. W., *Natural Gamma Ray Emissions in the Muddy J. Formation in Eastern Wyoming*, The Log Analyst, vol. 22 (2), March-April, 1981, Johnson, W., *Effect of Shaliness on Log Responses*, CWLS Journal, June, 1979, and Fertl, W. H. and Frost Jr., E., *Evaluation of Shaly Clastic Reservoir Rocks*, Journal of Petroleum Technology, September 1980. A better approach is an empirical equation from Hill, J. J., Shirley, O. J., and Klein, G. E., *Bound Water in Shaly Sands-Its Relation to $Q_v$ and Other Formation Properties*, The Log Analyst, May-June 1979, which relates $Q_v$ to bound water in clay, total porosity and water mineralization of the reservoir. Equation 34 does not depend on conditions specific to an area of investigation.

$$Q_v = \frac{\phi_{vcl}}{\phi_t \times (0.084 \times Co^{-\frac{1}{2}} + 0.22)} \tag{34}$$

In hydrocarbon bearing reservoirs, ions associated with clay become more concentrated in the remaining pore water, Waxman, above, and consequently $Q_v$ is divided by $S_{wt}$ as stated in equation 31. This is the basic reason the Waxman-Smits formula has been applicable to shaly reservoirs containing only dispersed clay. Indeed, producible hydrocarbons generally occur only in sand laminae where they occupy a part of the pore space. Shale laminae do not hold producible hydrocarbons; their pore space is filled with bound water and no hydrocarbons. Therefore, the concentration of ions in shale laminae associated with clay is not dependent on hydrocarbon saturation in near-by sand laminae. Consequently, only the $Q_v$ related to dispersed clay has to be divided by water saturation in sand laminae. For hydrocarbon bearing laminated shaly sand reservoirs, the effective concentration of exchange ions $Q_v'$ is defined as in equation 35:

$$Q_v' = \frac{Q_{vd}}{S_{wts}} + Q_{vl} \qquad (35)$$

$Q_{vd}$ and $Q_{vl}$ are computed by equation 34 using porosities and water mineralizations determined for sand and shale laminae.

Effective water saturation does not change in a sand lamina regardless of whether a sand bed is considered separately or as a part of a laminated reservoir or a thin laminar layer. Since Waxman-Smits formula computes $S_{wt}$, $S_w$ can be found from $S_{wt}$ as shown by Juhasz, I., *The Central Role of $Q_v$ and Formation Water Salinity in the Evaluation of Shaly Formations*, SPWLA 20th Annual Logging Symposium, Jun. 3–6, 1979, and then $S_{wts}$ can be determined from $S_w$ by equation 36:

$$S_{wts} = 1 - \frac{(1 - S_w) \times (\phi_{ts} - \phi_{cldhr})}{\phi_{ts}} \qquad (36)$$

In clear reservoirs filled only with water of a specific mineralization generally the higher formation resistivity is associated with higher formation resistivity factor. This is not the case in shaly reservoir. Compare two shaly sand reservoirs filled with water of the same mineralization; one formation with higher formation resistivity factor as defined by the Waxman-Smits model, could have higher, lower, or the same resistivity as the other formation. In shaly reservoirs, two factors compete with each other, namely, formation resistivity factor versus $Q_v$.

Higher clay content in a shaly reservoir leads to greater formation resistivity factor which should result in higher resistivity of the reservoir. But at the same time, higher clay content results in greater $Q_v$ which tends to reduce the resistivity of the reservoir. These two competing forces will prevail differently dependent on factors such as clay type, the mode of clay distribution, and the total and effective porosities. All of these factors to a certain extent determine values of F and $Q_v$. Water mineralization and water saturation also play very important roles.

As depicted in FIG. 4 where two samples have the same porosity, for all water conductivities above 33 mmho/cm, the sample with greater shale content has lower conductivity than the clean sample. But the shaly sample has higher conductivity for water conductivities below this value of 33 mmho/cm. In other words at lower water conductivities, $Q_v$ prevails over $F^*$ in the shaly sample. Indeed, if $F^*$ and $Q_v$ of two shaly water bearing reservoirs are known, equation 37 computes water conductivity at which their conductivities are equal:

$$C_w = \frac{B \times (F^*_1 \times Q_{v2} - F^*_2 \times Q_{v1})}{F^*_2 - F^*_1} \qquad (37)$$

This $C_w$ defines crossover points of the function $C_t = f(C_w)$ for both shaly reservoirs.

The presence of hydrocarbons adds a new dimension to the phenomena described above. Hydrocarbons increase reservoir resistivity but simultaneously increase the $Q_{vd}$ contribution to the reservoir conductivity according to equation 35. Assuming for simplicity that some shaly reservoirs have only dispersed clay, water conductivity $C_w$ for the two hydrocarbon bearing shaly reservoirs with equal conductivities is given by equation 38:

$$C_w = \frac{B \times (F^*_1 \times Q_{v2} \times S_{wt2} - F^*_2 \times Q_{v1} \times S_{wt1})}{F^*_2 \times S_{wt2} - F^*_1 \times S_{wt2}^2} \qquad (38)$$

Assume that both reservoirs also have the same water saturation $S_w$, then water conductivity $C_w$ at which their conductivities are equal is given by equation 39:

$$C_w = \frac{B \times (F^*_1 \times Q_{v2} - F^*_2 \times Q_{v1})}{S_{wt} \times (F^*_2 - F^*_1)} \qquad (39)$$

Comparing equations 37 and 39, one observes that a water conductivity at which shaly sand beds have the same conductivity is $1/S_{wt}$ times greater for hydrocarbon bearing reservoir in relation to similar water bearing reservoirs. For example, the water bearing samples in FIG. 3 have the same conductivity at $C_w$: 33 mmho/cm, but if they were oil bearing with $S_{wt}$: 50%, they would have the same conductivity at $C_w = 66$ mmho/cm; the conductivities of the shaly sample would be greater than those of the clean sample for all water conductivities below 66 mmho/cm.

Consequently, water bearing shaly sand reservoirs and shales could have higher resistivities than water bearing clean reservoirs with the same porosity and water conductivity, but the same hydrocarbon bearing shaly reservoirs could have lower resistivity than clean hydrocarbon bearing reservoirs with similar water saturation. That is one reason it is so important to take into account the increased contribution of clay cation exchange capacity to the conductivity of hydrocarbon bearing reservoirs, as stipulated by the Waxman-Smits model.

FORMATION WATER RESISTIVITY

In the original Waxman-Smits equation, water resistivity does not depend on clay content, i.e. it is assumed that the water in clay and sand pores has the same mineralization. This is another reason why Waxman-Smits model is primarily applicable only to reservoirs with dispersed clay. Since dispersed clay is mainly formed after the sand deposition, it is reasonable to assume that water mineralization in dispersed clay and sand pores is the same. But water mineralization in shales often is less than in adjacent shaly sands. Laboratory studies indicate that during diagenesis the expelled water shows progressively decreased mineralization with increasing overburden pressure, Chilingar, G. V., Rieke, H. H., III, and Robertson, J. O., Jr., *Relationship Between High Overburden and Moisture Content of Hallousite and Dickite Clays*, Geol. Soc. Am. Bull, 74, 1963, and Fertl, W. H., and Timko, D. J., *Association of Salinity Variations and Geopressures in Soft and Hard Rocks*, 11th Prof. Log Analysts Symposium, Los Angeles, California, May 1970. Thus the remaining water in shales should be fresher (i.e., less mineralized) than in surrounding shaly sands because, in the shaly sands, it is better protected from overburden compaction by larger sand grains.

Therefore, to use the Waxman-Smits model for laminated reservoirs, water resistivity has to be determined separately for shaly sands and shales. Then compound water resistivity can be computed using the percentages of shale and sand laminae in the reservoir and the water saturation in the shaly sand laminae. Consequently the compound water conductivity is computed by equation 40:

$$C_{wc} = \frac{C_w \times (\phi_e \times S_w + \phi_{cld}) + C_{wsh} \times \phi_{shl}}{\phi_e \times S_w + \phi_{vsh}} \quad (40)$$

Then compound water resistivity is given by equation 41:

$$R_{wc} = \frac{R_w \times R_{wsh} \times (\phi_e \times S_w + \phi_{vsh})}{R_{wsh} \times (\phi_e \times S_w + \phi_{cld}) + R_w \times \phi_{shl}} \quad (41)$$

EQUIVALENT CONDUCTANCE OF CLAY EXCHANGE CATIONS

Generally, the equivalent conductance of clay exchange cations or B is a function of temperature but for dilute solutions ($R_w > 0.05$ ohmm), it also depends on formation water salinity, Waxman supra. Thus if water conductivities of sand and shale laminae are different and at least one of them is in the dilute solution range, then the equivalent conductances of counterions in sand and shale laminae are also different. In this case, each should be determined separately from relationship between B and $R_w$ at various temperatures presented in Waxman, M. H., and Thomas, E. C., *Electrical Conductivities in Shaly Sands-I. The Relation Between Hydrocarbon Saturation and Resistivity Index; II. The Temperature Coefficient of Electrical Conductivity*. Journal of Petroleum Technology, February 1974. Then conductivity of clay counterions is given by equation 42:

$$B_c \times Q_v' = \frac{B_{sd} \times Q_{vd}}{S_{wts}} + B_{sh} \times Q_{vl} \quad (42)$$

From this expression and equation 35, the compound equivalent conductance of clay exchange cations Bc can be computed by equation 43:

$$B_c = \frac{R_{sd} \times Q_{vd} + B_{sh} \times Q_{vl} \times S_{wts}}{Q_{vd} + Q_{vl} \times S_{wts}} \quad (43)$$

The above discussion leads to the following modified Waxman Smits formula for water saturation in the laminated shaly sand reservoirs, see equation 44:

$$S_{wt} = \frac{F^* \times R_{wc}}{R_t \times (1 + R_{wc} \times B_c \times (Q_{vd} \times S_{wts}^{-1} + Q_{vl}))} \quad (44)$$

As before, F* is determined from equations 32 and 33, $R_{wc}$ is determined from equation 41, and $B_c$ is determined from equation 43.

When using equation 44 for water saturation determination in thinly laminated reservoirs, all variables and parameters in the equation have to be determined at the high resolution level.

FIELD EXAMPLE

Figure 8C:
FIGS. 8($a$–$c$) are a set of exemplary curves representing logs from a specified depth in a well wherein FIG. 8$a$ shows the original and reconstructed logs, FIG. 8$b$ shows conventional interpretation, and FIG. 8$c$ shows a high resolution interpretation.
Figure 8B:
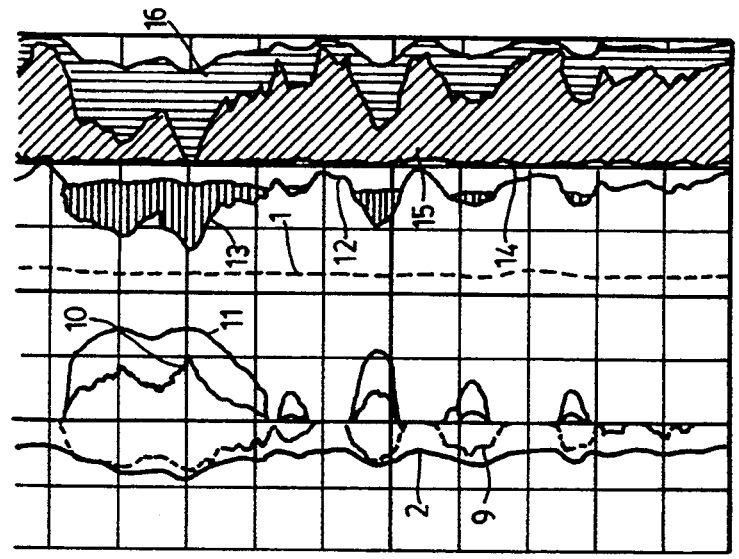
Figure 8A:
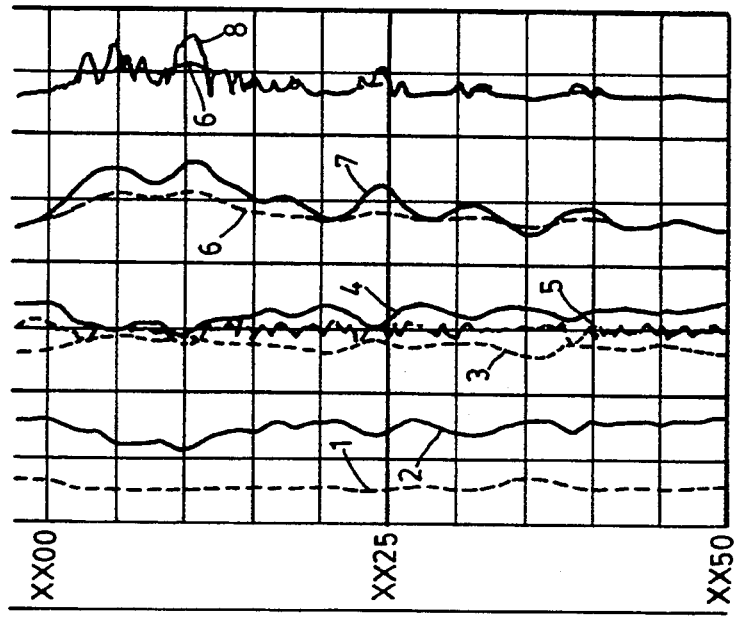

Evaluation of thinly laminated shaly sand reservoirs using the technique described above has several substantial advantages over conventional methods (without reconstructing logs to the high resolution level). The present technique provides more accurate and highly differentiated shaly sand properties such as shale volume, the mode of clay distribution, porosity, and water saturation. One of the examples of log interpretation by this technique in comparison with regular log interpretation is presented in FIG. 8. For both interpretations, the same parameters and the same water saturation equation (the Waxman-Smits model for laminated reservoirs) were used. The interval depicted in FIG. 8 represents a thinly laminated oil bearing reservoir with maximum porosities of about 33% for clean sand beds according to core and log data. Logs used for interpretation (FIG. 8a) include density, neutron, one of the dipmeter pad conductivities, and deep resistivity. The maximum original resistivity $R_t$ is about 2.5 ohmm while reconstructed sand component and composite high resolution resistivity logs reach 8 ohmm. At the top of the presented interval in FIG. 8 where relatively thick sand beds are developed, the high resolution technique computes water saturation only about 10% lower than the conventional technique. But in the interval below, where thin shaly sand beds prevail, this water saturation increases to 20% or more. For example, the thin bed at XX38-XX39 has high resolution water saturation only 45% (FIG. 8c) while conventional interpretation gives $S_w = 73\%$ for this bed (FIG. 8b). This difference is almost as large as the difference in saturation between hydrocarbon and water producing reservoirs. Above (XX29-XX32), two closely located thin shaly sand bends (FIG. 8c) are presented by conventional interpretation technique (FIG. 8b) as one relatively thick bed with maximum porosity and hydrocarbon saturation at XX30.5; according to the present high resolution technique, this is the location of the intervening shale lamina. The more accurate location of the thin shaly sand beds is another important advantage of the high resolution interpretation technique.

Figure 9:
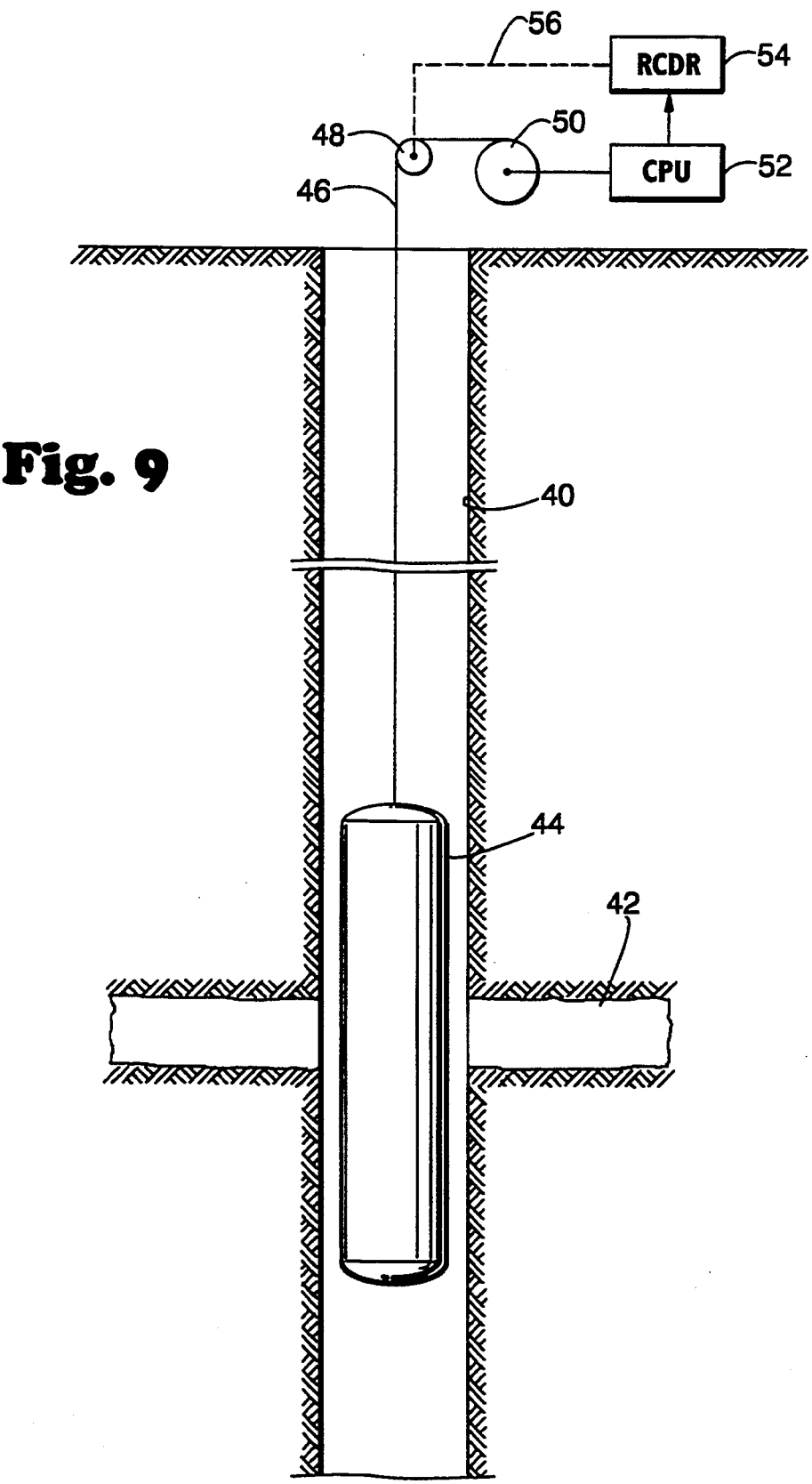
FIG. 9 shows a logging tool lowered in a well borehole for making measurements with respect to a laminated layer of alternate shale and sand laminates.

FIG. 9 represents one application for logging a laminate formation. In FIG. 9 of the drawings, a well 40 passes through a formation of interest at 42. Assume, for purposes of description, that the formation 42 is a plurality of laminar layers of sand and shale somewhat in the fashion represented in FIG. 1a. Assume further that a sonde 44 investigates the formations along the well borehole 40, and further assume that data is obtained of some property or variable X relating to the formations including the formation 42. Assume further that the sonde provides data from a low resolution investigation, or a high resolution investigation or with some other resolution therebetween, all as exemplified in the table given herein. This data is output on a logging cable 46 which extends to the surface and passes over a sheave 48. The cable 46 is spooled on a storage reel or drum 50. The conductors are output from the logging cable 46 to a CPU 52. The data is prepared in accordance with the present disclosure and is provided to a recorder 54. The recorder records the data as a function of depth. This is input through an electrical or mechanical depth recording mechanism 56.

In accordance with the teachings of the present disclosure, the variable X logged for the formation 42 is processed as taught herein and is converted to high resolution data for the variable X. This, as mentioned, can encompass several different variables which are measured along the well borehole and which variables are exemplified in FIG. 8 of the drawings. Referring back to FIG. 8, it is noted that the several traces are best identified by the reference numerals placed on FIG. 8 where the reference numerals 1–16 identify the following curves or readings:

1. Caliper
2. SP
3. Neutron log
4. Density log
5. Dipmeter conductivity
6. $R_t$
7. Reconstructed sand component resistivity
8. Reconstructed high resolution resistivity
9. Permeability
10. Gas indicator
11. Water saturation
12. Effective porosity
13. Oil filled effective porosity
14. Dispersed clay
15. Laminated shale
16. Sand matrix While the foregoing is directed to the preferred embodiment, the scope is determined by the claims which follow.

What is claimed is:

1. A method of preparing logs of laminated sand and shale formations comprising the steps of:
   (a) along a well borehole, making logging measurements with a logging tool having a specified vertical resolution across laminated sand and shale formations where the laminated formations have a thickness less than the vertical resolution of the logging tool and forming an output signal indicative of measurements made at a specified measurement resolution dependent on the logging tool vertical resolution;
   (b) forming a shale volume measurement from the logging tool for the laminated sand and shale formations;
   (c) forming the laminated sand and shale formation porosity; from the logging tool measurements;
   (d) forming the laminated sand and shale formation conductivity from the logging tool measurements; and
   (e) forming the laminated sand and shale formation water saturation.

2. The method of claim 1 wherein the water saturation is determined for the sand.

3. The method of claim 1 wherein the shale volume measurement includes an indication of the nature of the shale.

4. The method of claim 1 wherein the porosity and conductivity are determined for non flushed sand in the laminated sand and shale.

5. The method of claim 1 wherein the output signal represents a measurement made at a resolution defined by a selected vertical resolution at least as wide as the most thin lamination of sand or shale.

6. The method of claim 1 wherein the measurement is made at a specific depth and water saturation is determined for that depth.

7. A method of preparing logs of laminated sand and shale formations comprising the steps of:
   (a) along a well borehole, making logging measurements with a logging tool having a specified vertical resolution across laminated sand and shale formations where the laminated formations have a thickness less than the vertical resolution of the logging tool; and forming an output signal indicative of measurements made at a specified measurement resolution dependent on the logging tool vertical resolution;
   (b) converting the measured signal from the logging tool to a form comparable to that obtained by a high resolution tool capable of resolving measurements from a thinner sand or shale laminar layer measuring the region along the well borehole including the laminated sand and shale formation;
   (c) using the high resolution form of the signal to obtain a high resolution measure of conductivity for the laminated sand and shale formation; and
   (d) from the conductivity measure of the prior step, obtaining water saturation of the laminated sand and shale formation in accordance with a selected model relating to water saturation in sand or shale formations.

8. The method of claim 7 wherein the water saturation is for laminated sand in the laminated sand and shale formation.

9. The method of claim 7 wherein the converted signal is a high resolution representation of sand characteristics.

10. The method of claim 7 including the steps of forming signals representing formation porosity and conductivity.

11. The method of claim 10 wherein porosity and conductivity are formed as a function of well depth.

12. A method of preparing logs of laminated sand and shale formations comprising the steps of:
   (a) along a well borehole, making a logging measurement of laminated formations with a logging tool, said formations having a thickness less than the vertical resolution of said logging tool, wherein said logging tool has a specified vertical resolution form comparable to that obtained by a high resolution tool capable of resolving measurements from a thinner sand or shale laminar layer for measuring a variable parameter along the well borehole including the laminated sand and shale formation;
   (c) obtaining for the laminated sand and shale formation a density-neutron crossplot to obtain therefrom a measure of shale volume; and
   (d) based on the high resolution representation of the variable parameter and the shale volume, determining formation conductivity represented as a high resolution measurement.

13. The method of claim 12, further comprising the step of determining the water saturation for the sand.

14. The method of claim 12, further comprising the step of determining the porosity and conductivity for non flushed sand in the laminated sand and shale.

15. The method of claim 12 wherein said logging tool provides an output signal representative of a measurement made at a resolution defined by a selected vertical resolution at least as wide as the most thin lamination of sand or shale.

16. A method of preparing logs of laminated sand and shale formations comprising the steps of:
(a) along a well borehole, making logging measurements with a logging tool having a specified vertical resolution of a variable across formations including a laminated sand and shale formation where the laminated formations have a thickness less than the vertical resolution of the logging tool and forming an output signal indicative of measurements made with a specified measurement resolution wherein the measurement is an average for sand and shale in the sand/shale formation dependent on the logging tool vertical resolution;
(b) for the formations along the well borehole, measuring the shale volume; and
(c) based on the measurement along the well borehole and the shale volume, determining a formation measurement as a high resolution measurement.

17. The method of claim 16, further comprising the step of determining the water saturation for the sand.

18. The method of claim 16 further comprising the step of determining the porosity and conductivity for non flushed sand in the laminated sand and shale.

19. The method of claim 16 wherein said logging tool provides an output signal representative of a measurement made at a resolution defined by a selected vertical resolution at least as wide as the most thin lamination of sand or shale.

* * * * *